United States Patent [19]

Halvorson et al.

[11] 4,184,893

[45] Jan. 22, 1980

[54] PULSED RINSE OF PARTICULATE BEDS

[75] Inventors: David O. Halvorson, Beaumont, Tex.; Walter J. Sloan, Newark, Del.

[73] Assignee: E. I. Du Pont de Nemours and Company, Wilmington, Del.

[21] Appl. No.: 704,972

[22] Filed: Jul. 13, 1976

[51] Int. Cl.$^2$ .............................................. B08B 5/00
[52] U.S. Cl. .................................. 134/25 R; 134/37; 34/20; 210/32; 521/26
[58] Field of Search ............... 210/19, 30 R, 32, 34, 210/274; 34/9, 20; 134/25 R, 30, 37; 422/212, 223; 521/26

[56] References Cited

U.S. PATENT DOCUMENTS

| 595,182 | 12/1897 | Lardner | 210/274 |
|---|---|---|---|
| 2,855,364 | 10/1958 | Roberts | 210/274 |
| 3,223,747 | 12/1965 | Bohrer | 210/19 |
| 3,436,260 | 4/1969 | Duff | 210/274 |
| 3,455,819 | 7/1969 | Crits | 210/32 |
| 3,458,893 | 1/1949 | Campbell | 210/274 |
| 3,533,507 | 10/1970 | Aitken | 210/274 |
| 3,613,888 | 4/1970 | Harris | 210/274 |
| 3,698,554 | 10/1972 | Gail | 210/274 |
| 3,840,117 | 10/1974 | Ross | 210/274 |

FOREIGN PATENT DOCUMENTS 1352176 12/1962 France .................................... 210/34

OTHER PUBLICATIONS

"Separate Sulfonic and Sulfuric Acids with an Ion Exchange Resin" by Richard C. Glogau, David O. Halvorson, and W. John Sloan, Ind. & Eng. Chem., vol. 53, No. 4 (Apr. 1961), pp. 275-278.

Primary Examiner—Robert H. Spitzer
Assistant Examiner—Ernest G. Therkorn

[57] ABSTRACT

A method of rinsing a wetted particulate solid bed in liquid-contacting service by gravity draining or by gas blowing the bed and then rinsing it with successive gas-impelled pulses of rinse liquid.

2 Claims, 3 Drawing Figures

PULSED RINSE OF PARTICULATE BEDS

BRIEF SUMMARY OF THE INVENTION

Generally, this invention comprises a method of rinsing a wetted particulate solid bed in liquid-contacting service which comprises first draining the bed of the bulk of its liquid contents by gravity or by gas blowing and thereafter subjecting the bed to a succession of individual rinses wherein relatively small volumes of a preselected rinse liquid distributed over the full cross-section of the bed are impelled rapidly through the bed by gas pressure, and collecting the rinse liquid.

DRAWINGS

Figure 1:
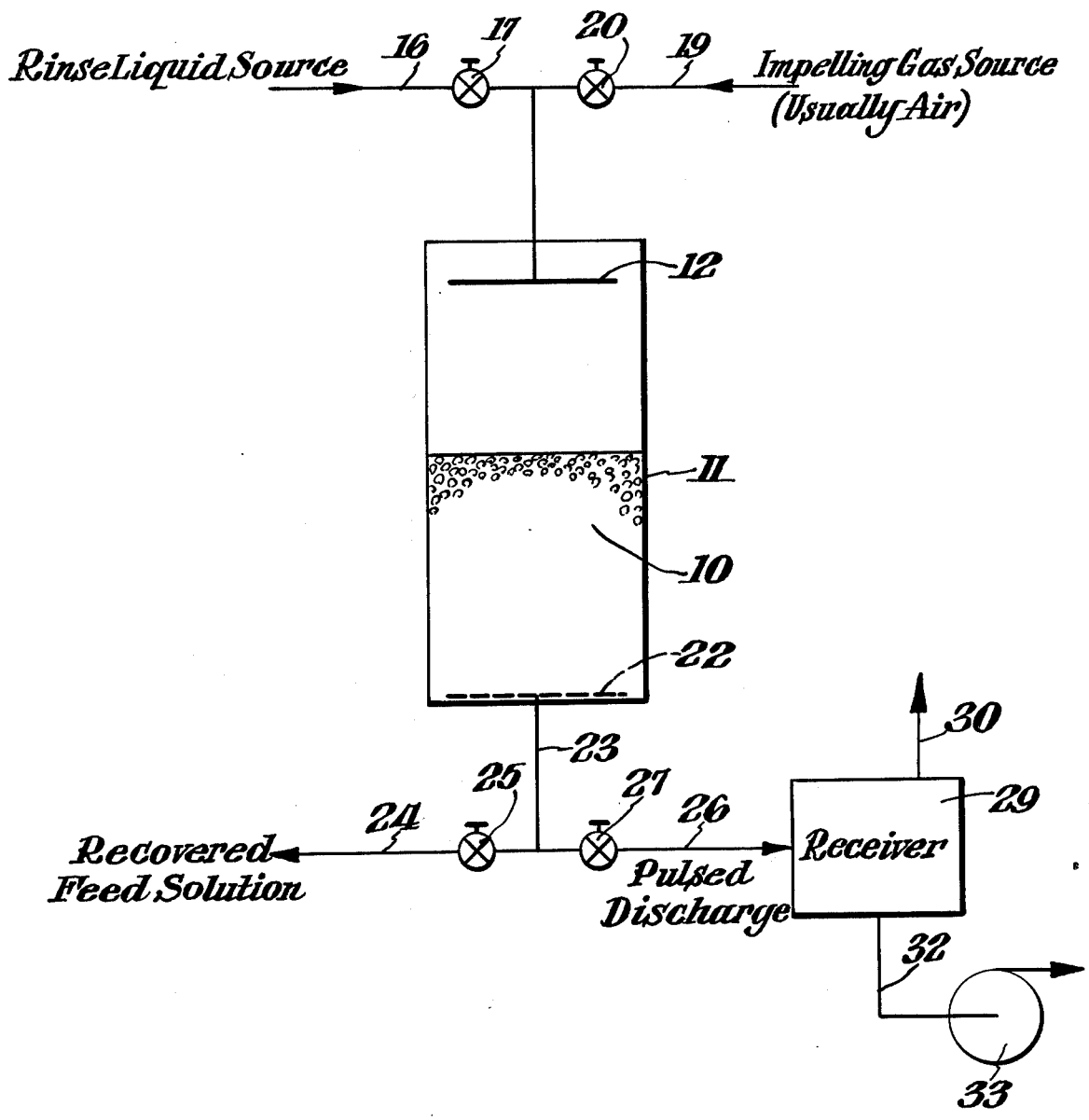
Figure 2:
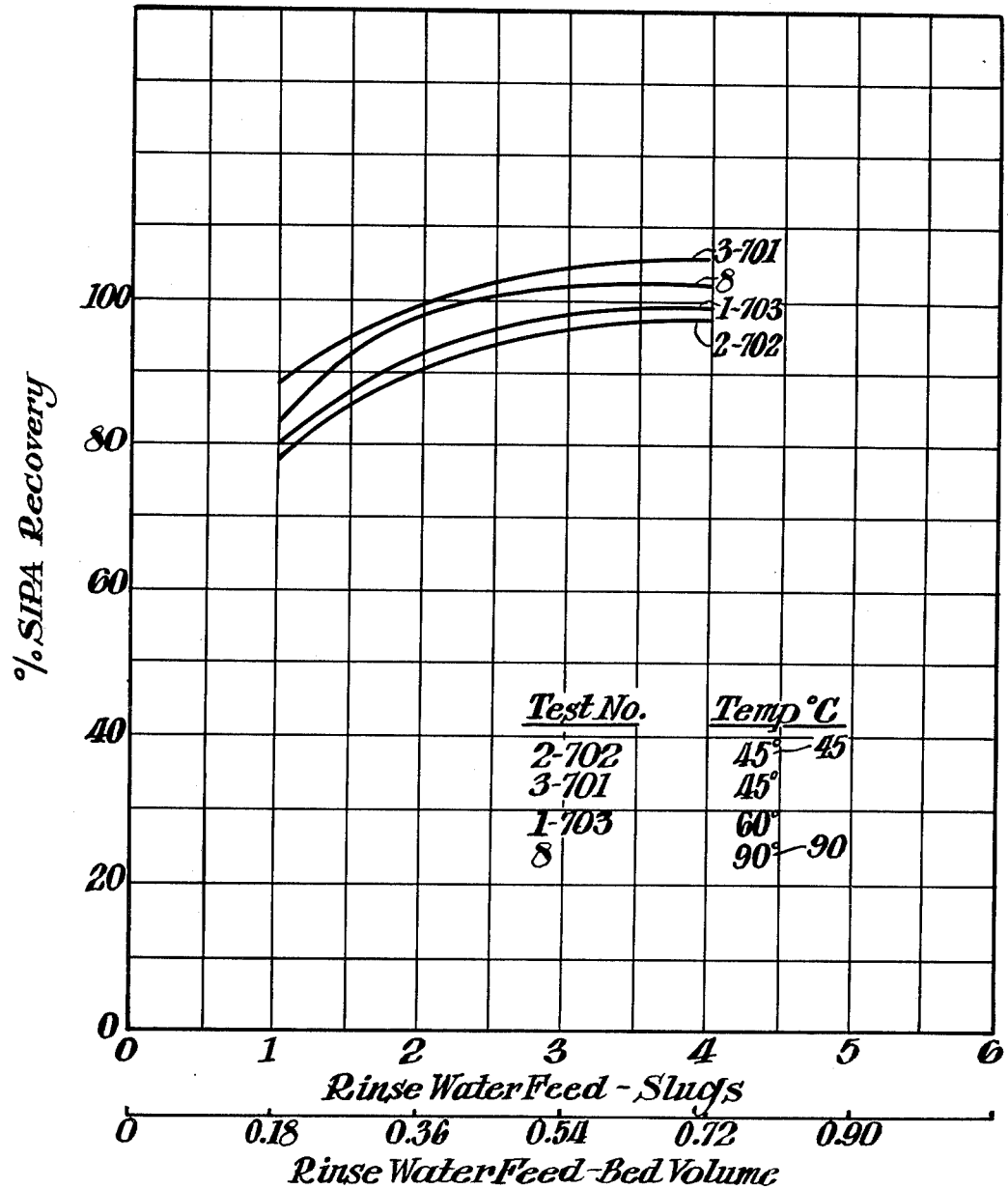
Figure 3:
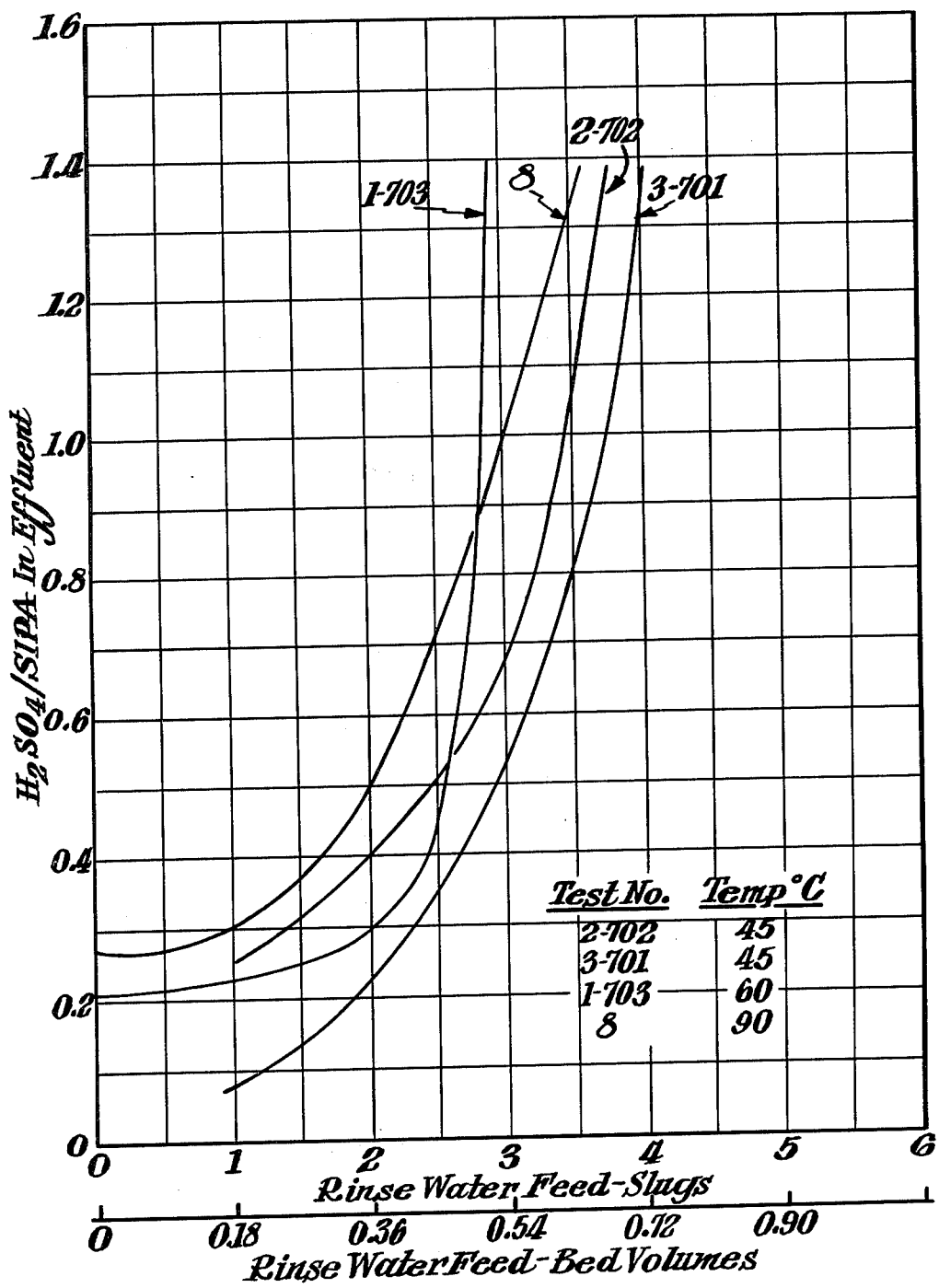

The following drawings constitute part of this specification, in which:

FIG. 1 is a schematic representation in side elevation cross-section of a preferred apparatus for practising the invention, FIG. 2 is a plot of percent recovery of a specific liquid feed (i.e., sulfoisophthalic acid) from an ion exchange particulate resin bed (adsorptively removing $H_2SO_4$) versus number of rinse water slugs impelled through the bed, and FIG. 3 is a plot of ratio of diffusible $H_2SO_4$/sulfoisophthalic acid in the effluent from a given ion exchange particulate resin bed versus number of rinse water slugs impelled through the bed.

THE INVENTION

It is frequently desirable to remove the void volume of entrapped liquid from beds of particulate solids with a minimum extraction of components or electrolytes held within the pores of the solids, and with a minimum dilution of the process liquid.

When ion exchange or sorbent beds become exhausted, their void volumes, i.e., the collective open volumes between adjacent particles, contain substantial quantities of process liquid. This liquid, particularly when it is other than rinse water, usually has a value, making recovery without dilution desirable. However, the rinse liquid can act as an extractant, thereby removing from the solids bed the impurities sorbed from the process stream and, therefore, it is desirable to use it sparingly.

Experience has shown that the void volume hold up cannot be removed by gravity drainage solely, or by blowing with a gas. Under the best conditions, approximately 2–4% of the gross bed volume is still retained, and there is even greater retention when the process liquid is viscous.

We have found that as little as one bed volume of liquid, if divided into a plurality of slugs or separate portions, can be unusually effective in displacing the retained liquid from the bed.

The principle is illustrated by the following example:

When "Dowex" ® 1-X16 (i.e., a highly cross-linked strong base ion exchange resin of the quaternary ammonium type) having a particle size in the range of 20–50 U.S. Standard mesh is employed to separate a sulfonic acid (e.g., 5-sulfoisophthalic acid, hereinafter referred to as SIPA) from sulfuric acid, all as described in full detail in *Industrial and Engineering Chemistry*, Vol. 53, No. 4, April 1961, pp. 275–278, inclusive, the authors of which were R. C. Glogau, D. O. Halvorson and W. J. Sloan, the latter two inventors of the instant improvement, there is need for a sharper and more complete separation of the SIPA content, which is not retained in large quantities by the resin particles, from the concentrated sulfuric acid content, which is largely retained by the resin.

We have found that, if wash liquid, in this instance water, is supplied to the top of the air blown resin bed in substantially evenly distributed fractions of about 20% of the gross resin bed volume and is impelled rapidly through the bed by air pressure (e.g., 40–60 lbs./sq.in. gage pressure), very complete removal of the SIPA is effected, whereas most of the sulfuric acid remains behind in the resin. Normally, a number of substantially identical successive rinses is advantageous, such as four or five applied sequentially at closely spaced time intervals of, for example, 30 seconds.

When the multiple rinsing is completed, the resin bed can be regenerated by the usual treatment, in the instance of the example process by a prolonged water rinse (without an air blow), the regeneration liquid being simply gravity-drained for collection as a separate fraction from which the sulfuric acid can be recovered, concentrated or neutralized, at the option of the user.

The void volume of ion exchange beds and other normally packed sperical solids is usually about 38%. However, the void volume can be considerably smaller, e.g., about 33%.

Ion exchange techniques have been developed for the removal of iron and other heavy metals from concentrated hydrochloric acid by use of basic ion exchange resins. The mechanisms is believed to be the formation of complex metal chlorides for which the basic resins have a very high selectivity. After removal of the hydrochloric acid from the voids of the resin bed by the herein described pulsed rinse technique, regeneration of the resin bed with a water rinse effectively removes metal complex chlorides from the resin. Sulfuric acid can be picked up by the bisulfate form of a basic resin, the resin again being regenerated with water. Proper displacement of the void volume of organics (or salts) plus sulfuric acid will prevent additional contamination of the feed with sulfuric acid extracted from the resin.

In the case of desiccant type dryers, viscous liquids retained prior to reactivation may be evaporated, or they may be charred in situ on the desiccant. Gas blows plus slugs of an easily evaporated and reclaimable rinse liquid, such as methanol, readily cleans the desiccant without adding an additional loading.

The purging of particulate solids beds according to this invention can be conducted at room temperatures; however, it is preferred to use a heated rinse liquid, particularly where the liquid held up in the voids is relatively viscous. In such a case, rinsing at higher temperatures of 45° C. to about 90° C. is advantageous for the most complete liquid removal.

A preferred apparatus for rinsing according to this invention is that shown in FIG. 1 wherein the bed of particulate solids 10 is retained within an elongated upright vessel 11 provided with a conventional liquid distributor 12, which can be a multiplicity of perforated hub radials, header laterals or a full cone spray, all adapted to relatively uniform cross-sectional distribution of the rinse liquid over the top of the bed. This same distributor is preferably utilized for the subsequent supply of the pressurized impelling gas.

Thus, liquid is first introduced to distributor 12 via line 16, provided with control valve 17, whereas impelling gas is immediately thereafter supplied via line 19, provided with control valve 20.

The rinse liquid, impelled by the gas, passes at relatively high velocity vertically down the bed as a coherent slug, which not only displaces any liquid in the bed voids but also shears adherent liquid from the bed particles, thereby effecting a clean, sharp separation of process liquid phase material from any substance held within the solids pores. Preferably, the sequential liquid-gas slugs are fed to the bed automatically by a conventional programmer, so that the operator need only start the rinsing operation by depression of a switch (not shown) at his control station.

As shown in FIG. 1, it is preferred to provide a rinse liquid collector 22 at the bottom of bed 10, which collector can be the usual device for supporting a bed of particulate solids. Thus, it can be a flat screen, screen-wrapped pipes, a bar grate, or even a bed of graded coal or stone. Liquid is then drawn off via drain line 23 which is split at the lower end into two draw-offs, one being recovered feed solution line 24, provided with control valve 25, whereas the other is pulsed discharge draw-off 26, provided with control valve 27. Valves 20 and 25 are held open so that, at the end of the loading cycle, the liquid in the voids is blown to recovered feed storage (not shown). Then valves 20 and 25 are closed and valve 27 opened while valves 17 and 20 are operated in alternation during the pulse rinse portion of the cycle.

Rinse liquid is collected in receiver 29, provided with an air vent 30. From here it can be recycled to the process via line 32 provided with pressure pump 33.

Typical rinse results are plotted in FIGS. 2 and 3. Column 11 was, in both cases, a 2" diameter×20' high glass column filled with "Dowex" ® 1-X16 ion exchange resin. The aqueous feed solution contained approximately 50% sulfoisophthalic acid plus 10% sulfuric acid. Percent SIPA recovery (ordinate axis) is practically 100% achieved in only 4 slug rinses, these being related collectively as rinse water feed in terms of bed volume on the lowermost abscissa. It will be seen that heating of the rinse liquid is beneficial in removing the last portions of residual SIPA.

Referring to FIG. 3, the relatively low concomitant pickup of sulfuric acid in the terms of its ratio with respect to SIPA is clearly shown as ordinate versus rinse water feedbed volume as abscissa for the same temperature samples as in FIG. 2.

The advantages of the pulse rinse system are: (a) substantially complete removal of the process liquid adhering to the solids without extraction of substances from inside the solids, (b) the use of very little liquid to accomplish the cleansing and (c) recovery of the displaced solution for recycle. Disadvantages are: (a') a slight dilution of the process stream with rinsing liquid, if the recovered liquid is to be returned to the process and (b') provision of some additional equipment for effecting the rinse.

Normally, the blow-slug rinse will be conducted as quickly as possible after process interruption, with a long first air blow to remove most of the void volume, and a long final air blow after rinsing is completed to make certain that all slug liquid has traversed the bed.

It will be understood that, if desired, process liquid and successive slugs of rinse liquid can be impelled through the bed by suction periodically applied to the bottom of the bed, instead of pressure applied at the top, or, indeed, by pressure applied at the top of the bed simultaneously with suction applied at the bottom.

What is claimed is:

1. A process for removing the void volume of process liquid from a wetted, fixed or stabilized bed of particulate solids comprising, in sequence: (a) downward blowing said fixed or stabilized bed of solids with a gas to displace a substantial portion of said process liquid from said voids, (b) quickly adding a preselected volume of rinse liquid at a preselected temperature over the entire top of said bed, said preselected volume being limited to a fraction of the total volume of said bed of solids, (c) quickly downward blowing said bed of solids with a gas to impel said rinse liquid through said bed, and (d) repeating steps (b) and (c) until the desired degree of removal of said void-retained process liquid is effected, or until the sum of said rinse liquid volumes (b) is approximately equal to the total volume of said bed of solids.

2. A process for removing the void volume of process liquid from a wetted, fixed or stabilized bed of particulate solids according to claim 1 in which either or both said process liquid and said added rinse liquid are removed by downward suction.

* * * * *